United States Patent [19]
Uozumi et al.

[11] 3,748,856
[45] July 31, 1973

[54] HYDRAULIC CONTROL SYSTEM FOR AUTOMATIC TRANSMISSION

[75] Inventors: Somio Uozumi; Hiroshi Arai, both of Aichi-ken, Toyota-shi, Japan

[73] Assignee: Toyota Jidosha Kogyo Kaiushiki Kaisha, Toyota-shi, Aichi-ken, Japan

[22] Filed: Jan. 20, 1972

[21] Appl. No.: 219,267

[30] Foreign Application Priority Data
Jan. 21, 1971    Japan.................................. 46/1392

[52] U.S. Cl......................... 60/357, 60/339, 60/347
[51] Int. Cl.............................................. F16d 33/12
[58] Field of Search.............. 60/12, DIG. 3, DIG. 5, 60/DIG. 2, 54, 357, 339

[56] References Cited
UNITED STATES PATENTS

| | | | |
|---|---|---|---|
| 3,053,051 | 9/1962 | Kelley..................................... | 60/54 |
| 3,055,169 | 9/1962 | Seibold et al........................ | 60/54 X |
| 3,347,042 | 10/1967 | Horsch................................... | 60/54 |
| 3,667,228 | 6/1972 | Ohie et al............................... | 60/54 |

*Primary Examiner*—Edgar W. Geoghegan
*Attorney*—Toren & McGeady

[57] ABSTRACT

A circulating oil passage control system for hydraulic automatic transmissions, comprising a pressure regulator valve adapted to regulate the pressure of oil delivered by an oil pump to supply hydraulic pressure to a shift control device of a planetary gear unit, and an oil passage control valve provided in oil circulation conduits directed through a torque converter to a lubrication circuit operated by an electromagnetic control valve to control the flow of pressure oil so that the oil is directed to the lubrication circuit through the torque converter or through a short-circuited conduit without passing through the torque converter. The electromagnetic control valve is provided with an electrical control circuit which energizes or de-energizes the control valve in conformity with engine cooling water temperature, representing the condition of the engine during warm-up, and the number of engine revolutions. When the water temperature is low in cold weather and the number of engine revolutions is low, the electromagnetic control valve is de-energized to switch the oil passage control valve so that the pressure oil is not supplied to the torque converter. When the number of engine revolutions exceeds a predetermined value, the electromagnetic control valve is energized and the pressure oil is supplied to the torque converter by the oil passage control valve. Furthermore, when a vehicle starts to move from a stationary position, the pressure oil is applied to the electromagnetic control valve through a feedback circuit to maintain the energizing operation of the electromagnetic control valve.

9 Claims, 4 Drawing Figures

HYDRAULIC CONTROL SYSTEM FOR AUTOMATIC TRANSMISSION

BACKGROUND OF THE INVENTION

This invention relates to a hydraulically operated automatic transmission for automobiles having fluid power transmission means, such as a torque converter or fluid coupling, and more particularly to the control of a fluid circuit provided between an oil pump and the torque converter or fluid coupling of the transmission.

The principal object of this invention is to eliminate the difficulties in starting the automobile engine in cold weather.

According to this invention, a fluid circuit between an oil pump and a torque converter is provided with a control valve adapted to supply oil to or relieve it from said fluid circuit. Said control valve is operated in relation to the number of engine revolutions and the engine cooling water temperature, engine oil temperature or transmission oil temperature which is the parameter representing the condition of the engine during warm-up.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there are illustrated preferred embodiments of the invention.

BRIEF DESCRIPTION OF THE DRAWINGS

In the drawings:

FIG. 2B' illustrates a modification of the electric control circuit of FIG. 2B.

DESCRIPTION OF THE PREFERRED EMBODIMENTS

Figure 1:
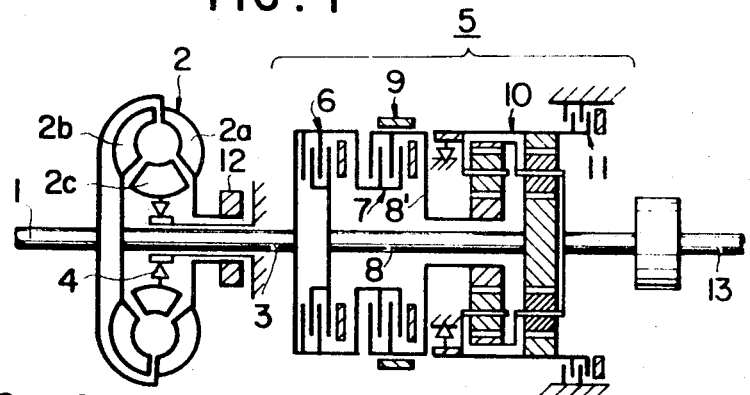
FIG. 1 is a schematic sectional diagram of an automatic transmission to which the hydrualic control system according to this invention is applied.

Referring now to FIG. 1, a hydraulic transmission comprises a torque converter 2 and a planetary gear unit 5. The torque converter 2 is connected to a driving shaft 1 which is integral with the engine crank-shaft. Said torque converter comprises a pump impeller 2a adapted to operate an oil pump 12, a turbine runner 2b conneted to an input shaft 3 adapted to transmit power to the planetary gear unit 5, and a stator 2c connected to a one-way clutch 4. Thus, said torque converter transforms the power from the driving shaft 1 and transmits said power to the input shaft 3. The planetary gear unit 5 comprises the input shaft 3, front and rear clutches 6 and 7, intermediate shafts 8 and 8', a planetary gear set 10, front and rear brakes 9 and 11, and an output shaft 13. The front clutch 6 is provided between the input shaft 3 and the first intermediate shaft 8, and the rear clutch 7 is located between the input shaft 3 and the second intermediate shaft 8'. Both intermediate shafts 8 and 8' are connected to the sun gear portion of the planetary gear set 10. The drum of the rear clutch 7 is provided with the front brake 9, and the planetary gear set 10 is provided with the rear brake 11 at the ring gear portion thereof. Moreover, the output shaft 13 is connected to the planetary carrier of said planetary gear set 10. Thus, the planetary gear unit 5 is adapted to perform each shifting operation by selectively operating said two sets of clutches 6, 7 and brakes 9, 11. The low speed gear is obtained by the operation of the front clutch 6 and the rear brake 11. The intermediate speed gear is obtained by operating the front clutch 6 and the front brake 9. The high speed gear is obtained by the front clutch 6 and the rear clutch 7. Furthermore, the reverse gear is obtained by the operation of the rear clutch 7 and the rear brake 11.

A circulating oil passage control system with which this invention is principally concerned is provided in order to supply hydraulic pressure by means of the oil pump 12 to the torque converter 2 of the above-described hydraulic transmission, to the hydraulic servos for operating the clutches 6, 7 and the brakes 9, 11 of the planetary gear unit, to the lubrication circuit of the planetary gear unit and to other system components. Said circulating oil passage control system will be described hereinbelow with reference to FIGS. 2A, 2B and 2B'.

Figure 2A:
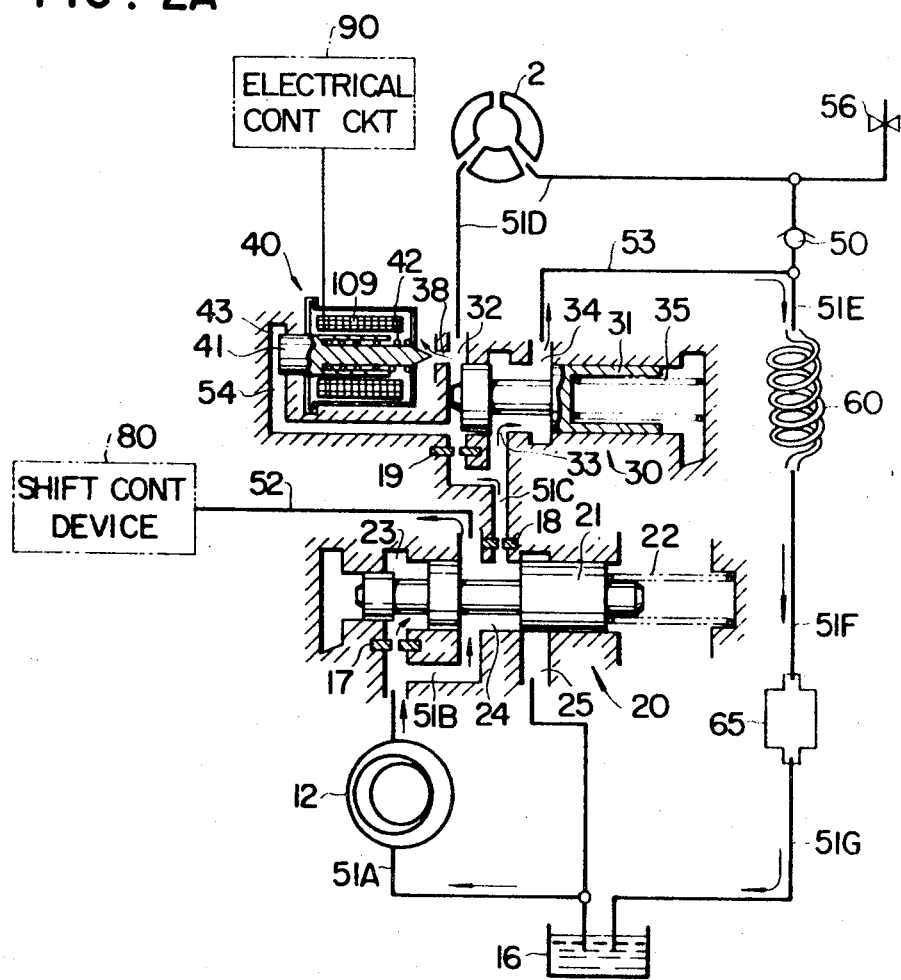
FIG. 2A is a schematic diagram which illustrates a fluid circuit for the control system of the invention.

Referring now to FIG. 2A, the circulating oil passage control system comprises the oil pump 12, the torque converter 2, a shift control device 80 for operating the hydraulic servos, a lubrication unit 65 of the planetary gear unit 5, an oil sump 16, a pressure regulator valve 20, a torque converter oil pasage control valve 30, an electromagnetic control valve 40, an electrical control circuit 90 for controlling the operation of said electromagnetic control valve 40, a one-way control valve 50, and oil cooler 60 and hydraulic conduits and orifices for connecting all the aforementioned components. The oil pump 12 is driven by the driving shaft 1 connected directly to the engine crank-shaft to pump oil from the oil sump 16 through an oil passage 51A to a circulation conduit 51B in accordance with the number of pump revolutions. The pressure regulator valve 20 comprises a valve member 21 having a spring 22 at the back thereof, an operating oil chamber 23 located on the side opposite to the spring 22 and connected through an orifice 17 to the circulation conduit 51B running from the oil pump 12, and oil chamber 24 connected to the circulation conduit 51B and branched to communicate through a conduit 52 to the shift control device 80 and through an orifice 18 to a circulation conduit 51C to the control valve 30, and a relieving conduit 25 adapted to return a part of the pressure oil to the oil sump 16 when the pressure oil from the oil pump 12 exceeds a predetermined hydraulic pressure. Thus, the pressure regulator valve 20 operates to increase the hydraulic pressure in the oil chambers 23 and 24 in conformity with the discharge of the oil pump 12 which is increased in accordance with the number of engine revolutions. When the preset load of the spring 22 is overcome, the valve member 21 moves to force the pressure oil from the oil chamber 24 into the circulation conduit 51C. When the hydraulic pressures in the oil chambers 23 and 24 are further increased with the increase in the number of revolutions of the oil pump 12, the valve member 21 brings the oil chamber 24 into communication with the relieving conduit 25, thus establishing an equilibrium at the position to maintain constant the oil pressures in the oil chambers 23 and 24. At this time, the hydraulic pressure regulated by the pressure regulator valve 20 becomes equal to the value obtained by dividing the load of the spring 22 by the pressure receiving area of the valve member 21 in the oil chamber 23. Said hydraulic pressure is supplied into the shift control device 80 through the conduit 52 and then actuates clutches 6, 7 and/or brakes 9, 11 by means of the hydraulic servos. At the same time, the pressure oil is supplied from the oil chamber 24 to the control valve 30. The orifice 18 is adapted to supply the oil volume having an appropriate pressure to the torque converter oil passage control valve 30 by a throttling effect.

The torque converter oil passage control valve 30 comprises a valve member 31 having a spring 35 at the back thereof, a first oil chamber 32 connected to the circulation conduit 51C through an orifice 19 and also connected to the torque converter 2 through a circulation conduit 51D, a second oil chamber 33 connected to the circulation conduit 51C, and a third oil chamber 34 connected to a short-circuited conduit 53. Furthermore, the control valve 30 is provided with the electromagnetic control valve 40 and a relief orifice 38 at the first oil chamber 32. Said electromagnetic control valve 40 comprises a plunger 41 having a spring 42 at the back thereof and adapted to open and close the relief orifice 38, and an electrical coil 109 which operates the plunger 41 in conformity with signals from the electrical control circuit 90. Thus, the torque converter oil passage control valve 30 quickly relieves pressure oil in large quantities from the first oil chamber 32 when the relief orifice 38 is opened with the electromagnetic control valve 40 de-energized, thereby reducing the hydraulic pressure in the oil chamber 32 to almost zero. The valve member 31 is moved to the left by the spring 35 to establish communication between the oil chamber 33 and the oil chamber 34, thus directing a part of the pressure oil to the short-circuited conduit 53. Conversely, when the relief orifice 38 is closed by the plunger 41 with the electromagnetic control valve 40 energized, the hydraulic pressure in the first oil chamber 32 is increased, thus moving the valve member 31 to the right, overcoming the tension of the spring 35. Consequently, the oil chamber 34 is closed, bringing the oil chamber 32 into communication with the oil chamber 33. Then, the pressure oil is supplied to the torque 2 converter to perform normal torque transmission. At this time, the first oil chamber 32 of the control valve 30 is brought into communication with a plunger operating chamber 43 of the electromagnetic control valve 40 through a feedback conduit 54. When the relief orifice 38 of the control valve 30 is once closed and the hydraulic pressure in the first oil chamber 32 is increased, the plunger 41 is pushed to the right by the pressure oil to keep the relief orifice 38 closed until the engine is stopped.

The circulation conduit 51D connected to the relieving side of the torque converter 2 is connected through the one-way control valve 50 to the short circuited conduit 53 to prevent the back flow from the short-circuited conduit 53. Therefore, oil is returned through the oil cooler 60 and the lubrication unit 65 of the planetary gear unit to the oil sump 16 to ensure oil feed to the lubrication unit 65, regardless of whether the pressure oil exists at the torque converter 2 or not.

The electrical control circuits 90 and 90' of the circulating oil passage control system of this invention will be described herein-below with reference to FIGS. 2B and 2B'. In the embodiment illustrated in FIG. 2B, there are provided an engine cooling water temperature detecting circuit 102a, utilizing a heat sensitive element such as, for example, a thermistor, for representing the warm-up condition of the engine as a function of voltage, and an engine revolution detecting circuit 103a for converting, for example, the number of operations of the breaker points of the engine distributor to an analogue value. The engine water temperature detecting circuit 102a is connected to the non-inverting input terminal of a voltage comparator 102. A reference voltage generator 102b is connected to the inverting input terminal of said voltage comparator 102. Thus, the voltage representing the temperature of the engine cooling water is compared with the reference voltage 102b, which may represent an engine cooling water temperature of for example, 5° C. If the engine cooling water temperature is higher than 5° C, a signal which shall be referred to as "1" is derived. The engine revolution detecting circuit 103a is connected to the non-inverting input terminal of another voltage comparator 103. A reference voltage generator 103b for generating a voltage representative of a reference revolting speed is connected to the inverting input terminal of said voltage comparator 103. The voltage representing the actual number of engine revolutions is compared with a reference voltage representing the reference engine revolving speed which is, for example, 1,200 rpm. If the number of engine revolution exceeds 1,200 rpm, a signal "1" is derived.

It should be understood that the designations "1" and "0" as used herein mean voltages at a high and a low level, respectively. As will be apparent to those skilled in the art, these are relative designations and they may be reversed under appropriate circumstances without departure from the scope of the invention.

The output of the voltage compartor 102 is connected through inverter circuits 104 and 105 to the input terminal of an OR circuit 107. The output of another voltage comparator 103 and the output of the inverter circuit 104 are connected through an AND circuit 106 to another input terminal of the OR circuit 107. The output of the OR circuit 107 is connected to the base of a power transistor 108. The collector of said transistor 108 is connected through the coil 109 of the electromagnetic control valve 40 to an engine key 101 adapted to issue a signal "1" when it is turned on, and further to a battery power source 100.

The operation of the circulating oil passage control system of the above-described construction will be described hereinbelow.

When the engine is stopped by turning off the engine key 101 after travelling under a sufficiently warmed-up condition, current flow to the coil 109 is interrupted, regardless of whether the signals from the voltage comparators 102 and 103 exist or not. At the same time, the oil pump 12 is stopped and the hydraulic pressure in the circulation conduit 51B is decreased. Thus, the plunger 41 of the electromagnetic control valve 40 opens the relief orifice 38 by the action of the spring 42 to drain the pressure oil of the torque converter 2 through said orifice 38. At this time, air is introduced instead of the oil from an orifice 56 to facilitage oil pressure relief from the torque converter 2 and the circulation conduit 51D.

When the engine is started in cold weather, the voltage comparator 102 emits an output signal "0" if the engine water temperature is lower than 5° C, and the inverter circuit 104 emits the output signal "1." At this time, the number of revolutions of the engine at starting is low in the order of several tens rpm to 150 rpm, and consequently the voltage comparator 103 also emits a signal "0." Therefore, the AND circuit 106 emits a signal "0." Since the "AND" circuit 106 and the inverter circuit 105 both emit a signal "0" the output signal of the OR circuit 107 is also "0," thus keeping the transistor 108 nonconducting. Consequently, the coil 109 of the electromagnetic control valve 40 is de-energized and the relief orifice 38 is opened by the plunger 41. The valve member 31 of the oil passage control valve 30 is pushed to the left by the spring 35, and therefore, if the pressure oil is supplied to the circulation conduit 51B by the oil pump 12, most of such pressure oil will pass through the short-circuited conduit 53 to be returned to the oil sump 16 through the lubrication unit 65. Thus, there will be an insufficient amount of pressure oil in the torque converter 2. Consequently, the engine resistance torque becomes small and engine starting in cold weather may be more easily accomplished. When shifting is effected from the parking range to the reverse range, or from the neutral range to the drive range, under an insufficiently warmed-up condition of the engine, no undue load is applied to the engine, because there is an insufficient amount of pressure oil in the torque converter 2, thus eliminating a cause of engine stalling.

When the number of engine revolutions is increased to more than 1,200 rpm in order to move the vehicle forward or backward, the output signal of the voltage comparator 103 becomes "1," and therefore the output signal of the AND circuit 106 also becomes "1," thus causing the transistor 108 to become conductive by the output signal of the OR circuit 107. The coil 109 of the electromagnetic control valve 40 is then energized to close the relief orifice 38. Thus, sufficient hydraulic pressure and a sufficient amount of oil are supplied into the torque converter 2 through the circulation conduit 51D by the operation of the oil passage control valve 30. Consequently, operation of the torque converter is accomplished.

In the above-described embodiment of the electrical control circuit 90, the coil 109 is maintained energized and the transistor 108 conducts during the time that the vehicle is moving at an ordinary speed. In another embodiment of the invention illustrated in FIG. 2B', the coil 109 is de-energized and the transistor 108 is rendered nonconductive during ordinary running of the vehicle. This mode of operation is enabled due to the fact that the operating condition of the electromagnetic control valve 30 will be maintained by the feedback circuit 54.

Figure 2B:
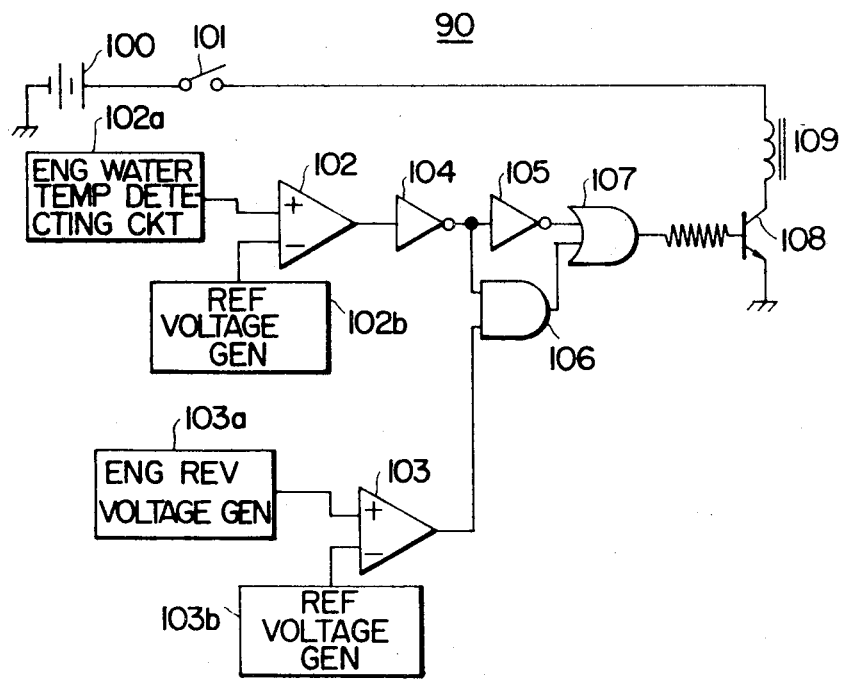
FIG. 2B is a schematic block diagram which illustrates an electric control circuit for the fluid circuit of FIG. 2A.
Figure 2B:
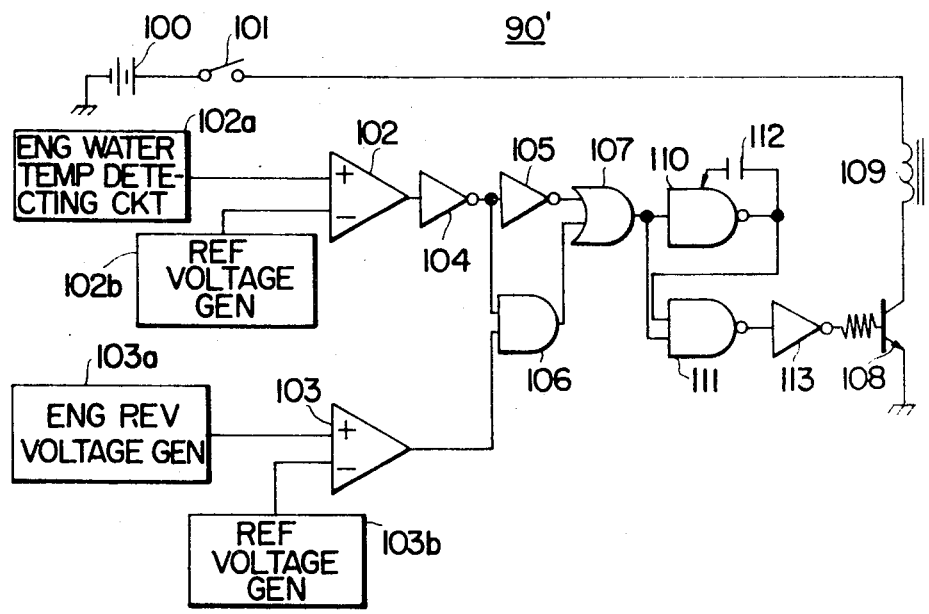

In the alternative electrical control circuit 90' of FIG. 2B', NAND circuits 110 and 111, a timing circuit consisting of a capacitor 112 and an inverter circuit 113 are provided between the OR circuit 107 and the base of the transistor 108 with the balance of this circuit being constructed in the same manner as the circuit 90 of FIG. 2. The NAND circuit 110 charges the capacitor 112 with its output with the illustrated polarity when the input signal is "0." Even if the input signal is converted to "1," the output signal is not changed to "0" instantly but is maintained as it is during the period of the time constant determined by the capacitance of the capacitor 112 and the NAND circuit 110.

When the engine is started in cold weather or is under idling conditions where the number of engine revolusions is small, the output of the OR circuit 107 becomes "0" and the output of the NAND circuit 111 becomes "1" in the same manner as described above. This output signal becomes "0" by means of the inverter circuit 113, thus driving the transistor 108 nonconductive and de-energizing the coil 109 to obtain the effects previously described. When the engine revolutions are increased for forward or backward movement, the output signal of the OR circuit 107 becomes "1" in the same manner as described above. However, the input of the NAND circuit 111 is the signal "1" during the predetermined early period of time due to the timing action, thus deriving the output signal "0." Consequently, the output signal of the inverter 113 becomes "1," thus rendering the transistor 108 conductive and energizing the coil 109 to enable vehicle operation at a steady speed. At this time, the hydraulic pressure in the oil chamber 32 of the oil passage control valve 30 is sufficiently increased through the circulation conduit 51C in the manner described above and this pressure oil is applied through the feedback circuit 54 to the plunger 41. After the elapse of said predetermined period of time, the output signal of the NAND circuit 110 becomes "0" to convert the output signal of the NAND circuit 111 to "1," thus converting the output of the inverter circuit 113 to the signal "0" to render the transistor 108 nonconductive. Therefore, the electromagnetic control valve 40 is de-energized. However, the relief orifice 38 closed by the plunger 41 is kept as it is by means of the hydraulic pressure of the oil chamber 43.

In the embodiment illustrated, the engine cooling water temperature is used as a physical valve representing the engine warm-up condition. Alternatively, it is possible to use engine oil temperature, torque converter oil temperature, etc. to represent this condition.

As described so far, the circulating oil passage control system of hydraulic transmissions according to this invention is adapted to control the pressure oil in the torque converter circulation circuit in accordance with the number of engine revolutions and in accordance with a physical value representing the engine warm-up condition, thus decreasing the resistance torque of the engine. Consequently, starting of the engine in cold weather is greatly facilitated and the engine stall at the time of starting can be prevented.

If the number of engine revolutions is increased above a predetermined value when the engine is not warmed up sufficiently, oil is fed to the circulation circuit of the torque converter. Accordingly, torque is transmitted to the torque converter with the increase in the number of engine revolutions when the acceleration pedal is depressed at the time of starting, thus ensuring smooth vehicle start and preventing engine stall.

Even if oil feed to the circulation circuit of the torque converter is stopped, oil circulation to the lubrication circuit of the planetary gear is always maintained, and therefore there will be no fear of seizure of the bearings.

The circulation circuit of the torque converter is provided with the orifice 56, through which pressure may be relieved. Furthermore, when the engine is stopped by turning off the ignition key, the relief orifice 38 is opened. Therefore, the oil in circulation circuit is rapidly relieved under a comparatively high temperature, thus exhibiting the above-described effects especially in cold regions.

Furthermore, the electromagnetic control valve is provided with the hydraulic feedback circuit. When the electromagnetic control valve is once turned on and the relief orifice of the torque converter circulation circuit is closed, the plunger of said electromagnetic control valve maintains the closed condition of the relief valve by the force of hydraulic pressure. Consequently, the electrical power loss is greatly decreased.

While specific embodiments of the invention have been shown and described in detail to illustrate the application of the principles of the invention, it will be understood that the invention may be embodied otherwise without departing from such principles.

What is claimed is:

1. In a circulating oil passage control system for providing oil to fluid power transmission means of a hydraulic automatic transmission for a vehicle driven by an engine, the combination comprising oil passage control valve means located within said circulation control system, said control valve means being operative to supply hydraulic pressure to said fluid power transmission means and to relieve hydraulic pressure from said circulating control system, and means for effecting operation of said oil passage control valve means in response simultaneously to the number of revolutions of said engine and to a temperature value representative of the operating condition of said engine.

2. A circulating control system according to claim 1, wherein said oil passage control valve means includes an operating oil chamber from which oil is directed to said fluid power transmission means, means for relieving pressure from said operating oil chamber, an electromagnetic control valve for controlling said pressure relieving means, and means for controlling said electromagnetic control valve in response to both engine revolutions and a temperature value representative of the operating condition of said engine to establish and terminate pressure relief from said operating oil chamber thereby to control the quantity of oil directed to said fluid power transmission means.

3. A circulating control system according to claim 2, wherein said electromagnetic control valve comprises a valve body movable between a first and a second position, electrical coil means for moving said valve body to said first position when energized, and hydraulic pressure feedback means for maintaining said valve body in said first position by hydraulic pressure force after said coil means have been energized to initially move said valve body to said first position and have subsequently been de-energized, said valve body operating to open and close said pressure relief means thereby to control flow of oil to said fluid power transmission means.

4. A circulating control system according to claim 2, comprising means for de-energizing said electromagnetic control valve when either the number of engine revolutions or the temperature value representative of the operating condition of the engine are below a predetermined value, said oil passage control valve means thereby being adapted by such de-energization to diminish hydraulic pressure to said fluid power transmission means by relieving hydraulic pressure from said circulating system through said pressure relief means.

5. A circulating control system according to claim 2, comprising switch means for de-energizing said electromagnetic control valve when operation of said engine is terminated, thereby to effect relief of hydraulic pressure from said circulating oil system and to diminish hydraulic pressure to said fluid power transmission means.

6. A circulating control system according to claim 1, comprising a lubrication unit for effecting lubrication of said hydraulic automatic transmission, passage means for directing oil flow from said fluid power transmission means to said lubrication unit, said passage means including a one-way valve for preventing reverse flow from said lubrication unit to said fluid power transmission means.

7. A circulating control system according to claim 2, comprising electrical logic circuit means for generating an electrical signal in accordance with both the number of engine revolutions and a temperature value representative of the operating condition of said engine, said electrical signal being operative to energize or de-energize said electromagnetic control valve.

8. A circulating control system according to claim 7, wherein said electrical logic circuit means comprise first electrical means for generating a signal in accordance with the number of engine revolutions, first reference voltage means for generating a signal representative of a predetermined number of engine revolutions, first voltage comparison means for comparing input signals received from said first electrical means and said first reference voltage means and for generating an output signal representative of said comparison, second electrical means for generating a signal representative of the operating temperature of said engine, second reference voltage means for generating a signal representative of a predetermined engine operating temperature level, second voltage comparison means for comparing input signals received from said second electrical means and said second reference voltage means and for generating an output signal representative of said comparison, and means for energizing and de-energizing said electromagnetic valve means in accordance with said output signals from said first and second voltage comparison means.

9. A circulating control system according to claim 8, wherein said electrical circuit logic means comprise electrical timing means for generating a signal to de-energize said electromagnetic valve means at a predetermined period of time after energization thereof.

* * * * *